(12) United States Patent
Chen (10) Patent No.: US 8,091,380 B2
(45) Date of Patent: Jan. 10, 2012

(54) MOTOR-OPERATED SELECTOR VALVE AND REFRIGERATION CYCLE DEVICE FOR REFRIGERATORS

(75) Inventor: Bin Chen, Zhejiang Province (CN)

(73) Assignee: Zhejiang Sanhua Climate and Appliance Controls Group Co, Ltd, Chengguan Town (CN)

( * ) Notice: Subject to any disclaimer, the term of this patent is extended or adjusted under 35 U.S.C. 154(b) by 569 days.

(21) Appl. No.: 12/075,217

(22) Filed: Mar. 10, 2008

(65) Prior Publication Data

US 2008/0236193 A1   Oct. 2, 2008

(30) Foreign Application Priority Data

Mar. 29, 2007   (CN) .......................... 2007 1 0067844

(51) Int. Cl.
  *F25B 1/00*   (2006.01)
(52) U.S. Cl. .......................................... 62/498; 62/118
(58) Field of Classification Search .................. 62/117, 62/198, 498, 527; 137/625.11, 625.43, 625.46; 251/129.11, 206–211, 340, 349
See application file for complete search history.

(56) References Cited

U.S. PATENT DOCUMENTS 5,885,062 A * 3/1999 Inoue et al. ................... 417/280
6,591,619 B2 * 7/2003 Kaneko et al. ................. 62/117

FOREIGN PATENT DOCUMENTS

| CN | 1928408 A | 3/2007 |
| JP | 2002349744 A | 9/2002 |
| JP | 2002276827 A | 12/2002 |
| JP | 2002349744 A * | 12/2002 |
| KR | 100454602 B1 | 10/2004 |
| KR | 20050023788 A | 3/2005 |

OTHER PUBLICATIONS

Decision for Registration dated Aug. 3, 2009, from corresponding Korean Application No. 20080026880 (with English translation).
Korean Office Action dated Mar. 9, 2009, from corresponding Korean Application No. 20080026880.
Chinese Search Report dated Nov. 20, 2009 from corresponding Chinese Application No. 200710067844.8.

* cited by examiner

*Primary Examiner* — Frantz Jules
*Assistant Examiner* — Emmanuel Duke
(74) *Attorney, Agent, or Firm* — Wolf, Greenfield & Sacks, P.C.

(57) ABSTRACT

A motor-operated selector valve relating to refrigerating technology is provided. In the present invention, a slider is controlled by a stepper motor so as to be rotatablely displaced among four positions on a flat bottom surface of a valve seat. Three outlets on the flat bottom surface are communicated with a normal open inlet in the valve seat via flow-guiding orifices in the slider respectively. In the first working position, the first outlet and the third outlet are in communication with the normal open inlet at the same time; in the second working position, the second outlet is in communication with the normal open inlet; in the third working position, the third outlet is in communication with the normal open inlet; in the fourth working position, the first outlet is in communication with the normal open inlet.

17 Claims, 5 Drawing Sheets

Fig.1

(Prior Art)

MOTOR-OPERATED SELECTOR VALVE AND REFRIGERATION CYCLE DEVICE FOR REFRIGERATORS

CROSS-REFERENCES TO RELATED APPLICATIONS

This application claims the benefit of Chinese Application No. 200710067844.8 filed on Mar. 29, 2007.

FIELD OF THE INVENTION

The present invention relates to refrigerating technology, specifically to a motor-operated selector valve and a refrigeration cycle system device used in refrigerators with freezing section and/or variable temperature section.

BACKGROUND OF THE INVENTION

With the improvement of living standard and the development of refrigerator-related technologies, refrigerators provided with sections for keeping fresh at 0° C. and soft freezing at −7° C., or refrigerators featuring adjustable sections of variable temperature, have become dominant products of superior refrigerators in China.

Figure 1:
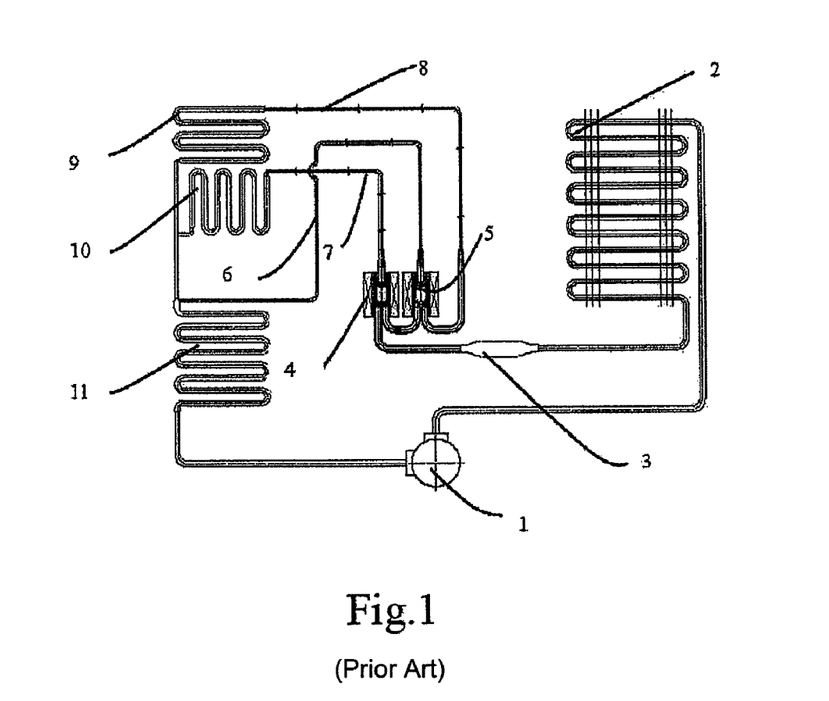
FIG. 1 is a schematic view of the refrigerating system used in a prior art refrigerator with a variable temperature section.

The main technology employed in the existing refrigerators of this kind is that a parallel connected assembly, constituted by a bistable two-position three-way solenoid valve and a bistable single-way valve, is used such that the number of the temperature section can be increased, as shown in FIG. 1. The functions achieved by such a parallel connected assembly constituted by a bistable two-position three-way solenoid valve and a bistable single-way valve are that: an inlet, three outlets and then four combined functional modes can be obtained.

The refrigerating system for refrigerators shown in FIG. 1 additionally comprises a variable temperature section evaporator (a refrigerator with a section for keeping fresh at 0° C. and soft freezing at −7° C. may be also provided), the refrigerating system employs a bistable solenoid valve and a bistable single-way valve connected in parallel and has the following four refrigerating operation modes:

Mode No. 1, the mode of refrigeration cycle through single circuit, is as follows:
compressor 1→condenser 2→drier-filter 3→solenoid valve 4→straight solenoid valve 5→refrigerator-applied capillary tube 8→refrigerator-applied evaporator 9→freezer-applied evaporator 11→compressor (suction);

Mode No. 2, the mode of refrigeration simultaneously through two circuits, is as follows:
compressor 1→condenser 2→drier-filter 3→solenoid valve 4→straight solenoid valve 5→refrigerator-applied capillary tube 8→refrigerator-applied evaporator 9→freezer-applied evaporator 11→compressor (suction);
compressor 1→condenser 2→drier-filter 3→solenoid valve 4→variable temperature capillary tube 7→variable temperature evaporator 10→freezer-applied evaporator 11→compressor (suction);

Mode No. 3, the mode of refrigeration simultaneously through two circuits, is as follows:
compressor 1→condenser 2→drier-filter 3→solenoid valve 4→variable temperature capillary tube 7→variable temperature evaporator 10→freezer-applied evaporator 11→compressor (suction);
compressor 1→condenser 2→drier-filter 3→solenoid valve 4→straight solenoid valve 5→freezer-applied capillary tube 6→freezer-applied evaporator 11→compressor (suction);

Mode No. 4, the mode of refrigeration through single circuit, is as follows:
compressor 1→condenser 2→drier-filter 3→solenoid valve 4→straight solenoid valve 5→freezer-applied capillary tube 6→freezer-applied evaporator 11→compressor (suction).

The afore-mentioned parallel connected assembly including two bistable two-position three-way solenoid valves, when is used, has the following disadvantages:

The assembly is complicated in structure and occupies big space in a refrigerator; The action noise generated by the bistable solenoid valve is big;

The action frequency will be increased when employing two solenoid valves, thus the noise becomes a key factor which deteriorates the quality of a refrigerator;

The bistable solenoid valves are driven by half-wave pulse similar to alternating current, thus being vulnerable to interferences and making it necessary to add sustain pulses periodically so as to avoid errors, yet applying periodical pulses further deteriorates the quality of a refrigerator in respect of noise.

A shorted circuit exists when two circuits are communicated through at the same time in refrigeration mode No. 3, to solve this problem, it is necessary to employ three single-way solenoid valves connected in parallel in some systems in order to meet functional requirements thereof.

SUMMARY OF THE INVENTION

The present invention aims at overcoming defects existing in prior art, such as complicated assembly structure, big noise, being vulnerable to interferences etc., to this end, an motor-operated selector valve and a refrigeration cycle device for refrigerators are provided that can optimize the refrigerating system. Therefore, the invention employs the following technical solutions:

An motor-operated selector valve, characterized by comprising:

a valve chamber, a valve seat thereof being provided with a normal open inlet and a flat bottom surface, wherein a first outlet, a second outlet and a third outlet are provided in sequence in the flat bottom surface;

a magnetic rotor component which is disposed within the valve chamber and rotatablely displaced under a driving force;

a slider which is disposed within the valve chamber and moved along with the magnetic rotor component, wherein the slider hermetically abuts against the flat bottom surface;

and a coil component for providing said driving force, wherein the coil component together with the magnetic rotor component constitutes a stepper motor that controls the rotary displacement of the slider among four positions on the flat bottom surface, corresponding to the four positions, the three outlets are communicated with the normal open inlet, respectively, via flow-guiding orifices provided in the slider, said four positions being:

the first working position, in which the first outlet and the third outlet are in communication with the normal open inlet at the same time, the second outlet is closed;

the second working position, in which the second outlet is in communication with the normal open inlet, and the first outlet, the third outlet are closed;

the third working position, in which the third outlet is in communication with the normal open inlet, and the first outlet, the second outlet are closed;

the fourth working position, in which the first outlet is in communication with the normal open inlet, and the second outlet, the third outlet are closed.

As further improvement and supplementation for the afore-mentioned motor-operated selector valve, the invention further includes the following additional technical features:

Said four working positions are arranged in a successive manner. The initial position of said stepper motor corresponds to the first working position, and the final position of said stepper motor corresponds to the fourth working position. Alternatively, the initial position of said stepper motor corresponds to the fourth working position, and the final position of said stepper motor corresponds to the first working position.

In any case, at least one of said two communicating passageways communicates the normal open inlet with one of the three outlets.

Said communicating passageways are two holes or gaps formed in the slider.

Said two communicating passageways are located on a circle which takes the rotating center of the slider as the center, and a communicating passageway angle is formed between the two communicating passageways; the three outlets are located on a circle which takes the rotating center of the slider as the center, and an outlet angle is formed between the two adjacent outlets, wherein said communicating passageway angle is two times bigger than said outlet angle.

Said magnetic rotor component is supported within the valve chamber by a supporting shaft to which said slider is connected.

Said slider and the supporting shaft are connected through at least one axially slidable key and keyway. A compression spring is supported between the slider and the magnetic rotor component such that a hermetical engagement between the slider and the flat bottom surface is ensured. That is, a pre-tightening pressure is created between the slider and the respective flat bottom surface on the valve seat by means of the compression exerted by the spring, so that the leakage is controlled.

The valve chamber is surrounded by members including an valve casing, the magnetic rotor component is provided with a sleeve having a tapered surface at a portion contacting the valve casing, one end of the supporting shaft is disposed within the sleeve, the valve casing is provided with a concave formation at a portion contacting the sleeve, which, under the force exerted by the spring disposed between the magnetic rotor and the slider, provides a self-centering between the magnetic rotor component and the valve casing.

A stopper is provided between the valve seat and the magnetic rotor component; a cushion is mounted on the stopper for attenuating the working noise at the starting point.

The slider is made from materials such as PPS, PA or PTFE.

A refrigeration cycle device for refrigerators is provided, characterized by comprising a compressor, a condenser, a drier-filter which are connected in sequence following the flowing direction of the refrigerant; the drier-filter is then connected with a normal open inlet of an motor-operated selector valve, and the first, second, third outlets of the motor-operated selector valve are connected to a refrigerator-applied evaporator, a freezer-applied evaporator, a variable temperature evaporator via a refrigerator-applied capillary tube, a freezer-applied capillary tube, a variable temperature capillary tube, respectively; said refrigerator-applied evaporator and the variable temperature evaporator are connected in parallel, afterwards the circuits thereof are united and then connected in series with the freezer-applied evaporator; the freezer-applied evaporator is then connected to the input of the compressor via a duct; the working modes of said motor-operated selector valve are controlled by a stepper motor;

In the first working position, the first outlet and the third outlet are in communication with the normal open inlet at the same time, and the second outlet is closed, consequently the following two circuits are operative to refrigerate at the same time: the refrigerator-applied evaporator→the freezer-applied evaporator; and the variable temperature evaporator→the freezer-applied evaporator;

In the second working position, the second outlet is in communication with the normal open inlet, and the first outlet, the third outlet are closed, consequently the freezer-applied evaporator is operative to refrigerate;

In the third working position, the third outlet is in communication with the normal open inlet, and the first outlet, the second outlet are closed, consequently the variable temperature evaporator and the freezer-applied evaporator, which are now connected in series, are operative to refrigerate;

In the fourth working position, the first outlet is in communication with the normal open inlet, and the second outlet, the third outlet are closed, consequently the refrigerator-applied evaporator and the freezer-applied evaporator, which are now connected in series, are operative to refrigerate.

Alternatively, a refrigeration cycle device for refrigerators is provided, characterized by comprising a compressor, a condenser, a drier-filter which are connected in sequence following the flowing direction of the refrigerant; the drier-filter is then connected with a normal open inlet of an motor-operated selector valve, and the first, second, third outlets of the motor-operated selector valve are connected to a variable temperature evaporator, a freezer-applied evaporator, a refrigerator-applied evaporator via a variable temperature capillary tube, a freezer-applied capillary tube, a refrigerator-applied capillary tube, respectively; said variable temperature evaporator and refrigerator-applied evaporator are connected in parallel, afterwards the circuits thereof are united and then connected in series with the freezer-applied evaporator; the freezer-applied evaporator is then connected to the input of the compressor via a duct; the working modes of said motor-operated selector valve are controlled by a stepper motor:

In the first working position, the first outlet and the third outlet are in communication with the normal open inlet at the same time, and the second outlet is closed, consequently the following two circuits are operative to refrigerate at the same time: the variable temperature evaporator→the freezer-applied evaporator; and the refrigerator-applied evaporator→the freezer-applied evaporator;

In the second working position, the second outlet is in communication with the normal open inlet, and the first outlet, the third outlet are closed, consequently the freezer-applied evaporator is operative to refrigerate;

In the third working position, the third outlet is in communication with the normal open inlet, and the first outlet, the second outlet are closed, consequently the refrigerator-applied evaporator and the freezer-applied evaporator, which are now connected in series, are operative to refrigerate;

In the fourth working position, the first outlet is in communication with the normal open inlet, and the second outlet, the third outlet are closed, consequently the variable temperature evaporator and the freezer-applied evaporator, which are now connected in series, are operative to refrigerate.

Advantageous effects of the invention lie in:

The driving fashion of the motor-operated selector valve is significantly different from that of a solenoid valve, thus eliminating the bumping noise generated by the action of the valve core of the solenoid valve, additionally, since the motor-operated selector valve is driven in the fashion of rotary displacement, action noise thereof can be lower than the working noise of the compressor and can be controlled to be less than 30 dB (A) at a distance of 30 cm; power supply can be cut off after the switch among the working states of the motor-operated selector valve, as a stable working state can be ensured through the self-maintaining function of magnetic poles of the stepper motor and the magnetic rotor, as a result, energy consumption of the valve itself is reduced by employing the motor-operated selector valve.

With a refrigeration cycle device for refrigerators employing the afore-mentioned motor-operated selector valve instead of a plurality of solenoid valves can optimize the refrigerating system, save energy, reduce cost, as well as enhance the quality of refrigerators.

BRIEF DESCRIPTION OF THE DRAWINGS

FIGS. 4(a), 4(b) are structural schematic views of the slider of the invention, wherein FIG. 4(b) is the cut-away view along E-E line of FIG. 4(a).

FIGS. 5(a), 5(b) are schematic views of another structure of the slider of the invention, wherein FIG. 5(b) is the cut-away view along K-K line of FIG. 5(a).

In the Figures: 1—compressor; 2—condenser; 3—drier-filter; 4—bistable single-way solenoid valve; 5—bistable two-position three-way solenoid valve; 6—freezer-applied capillary tube; 7—variable temperature capillary tube; 8—refrigerator-applied capillary tube; 9—refrigerator-applied evaporator; 10—variable temperature evaporator; 11—freezer-applied evaporator; 22—coil component; 23—valve body component; 24—fixing pin; 25—valve chamber; 30—valve seat component; 31—valve casing; 32—magnetic rotor component; 32a—magnetic rotor; 32b—supporting shaft; 33—sleeve; 34—spring; 35—slider; 35a—sealing surface; 35b1/35b2—communicating passageway; 36—valve seat; 36a—flat bottom surface; 37—cushioning rubber; 38—stopper pin; 39a/39b/39c—outlet duct; 40—inlet duct; 50—compressor; 51—condenser; 52—drier-filter; 53—motor-operated selector valve; B—first outlet; C—second outlet; D—third outlet; 57—freezer-applied capillary tube; 58—variable temperature capillary tube; 59—refrigerator-applied capillary tube; 60—refrigerator-applied evaporator; 61—variable temperature evaporator; 62—freezer-applied evaporator; A—normal open inlet.

DETAILED DESCRIPTION OF THE INVENTION

The invention will be illustrated in details in conjunction with the accompanying drawings thereof in the following.

Figure 2:
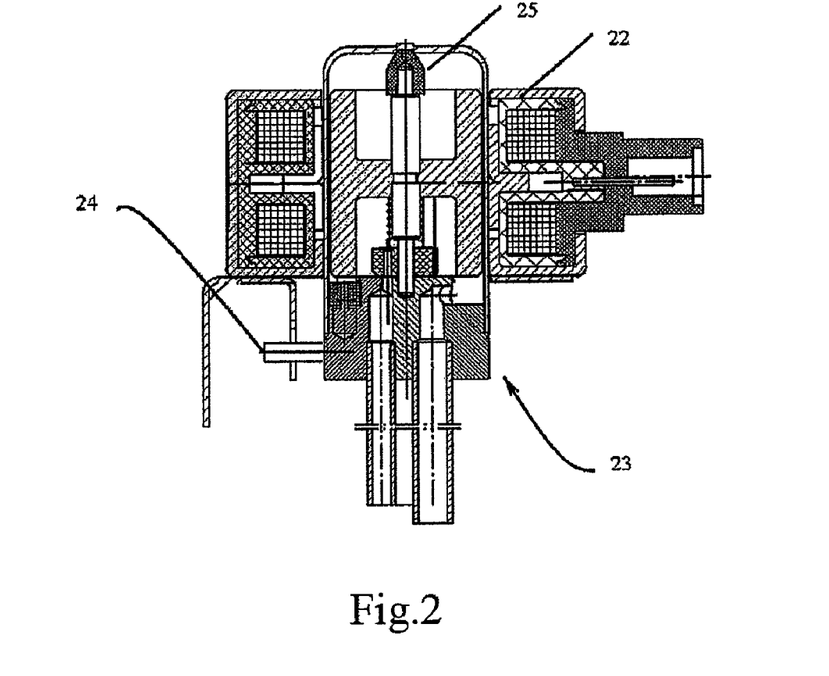
FIG. 2 is a schematic view of axially cut-away structure of the motor-operated selector valve of the invention.

As is shown in FIG. 2, the motor-operated selector valve of the invention mainly comprises three parts: coil component 22, valve body component 23, and fixing pin 24. The valve body component 23 and the coil component 22 are fixedly connected via the fixing pins.

Figure 3:
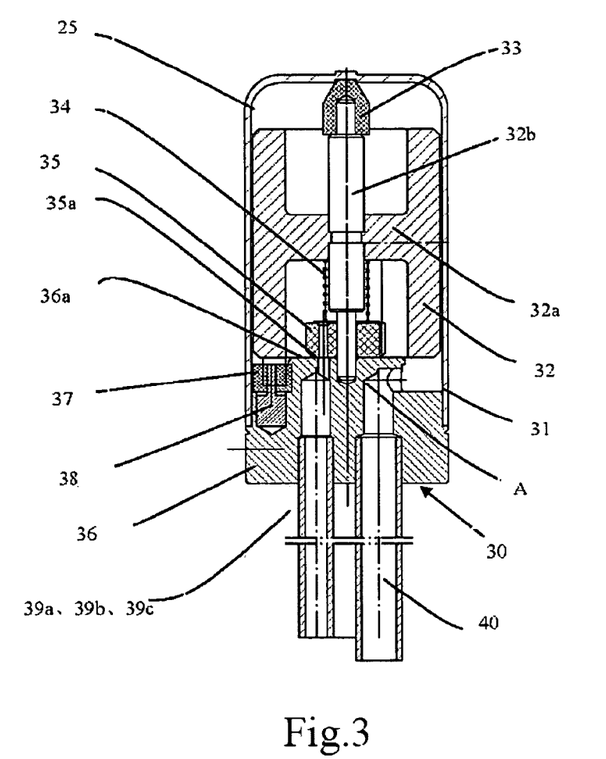
FIG. 3 is a schematic view of axially cut-away structure of the motor-operated selector valve shown in FIG. 2.
Figure 4A:
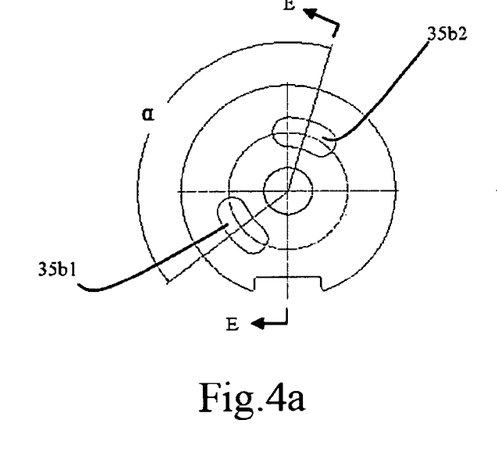
Figure 4B:
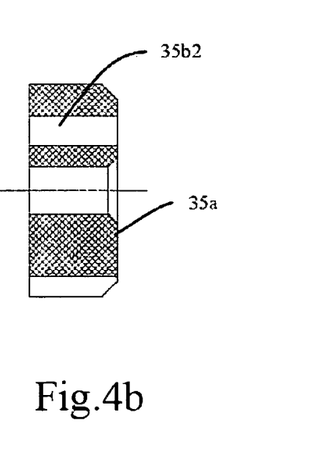
Figure 5A:
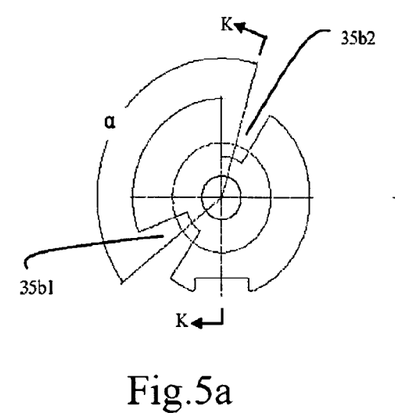
Figure 5B:
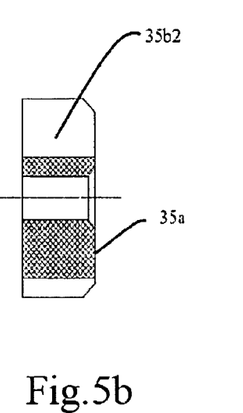

As is shown in FIG. 3, the valve body component 23 is a cylindrical structural component constituted by a valve seat component 30 and an valve casing 31, the valve seat component 30 includes an valve seat 36, a cushioning rubber 37, a stopper pin 38, outlet ducts 39a, 39b, 39c, an inlet duct 40, the inlet duct 40 and the outlet ducts 39a, 39b, 39c are welded to the valve seat 36 by soldering, a flat surface 36a is provided on the valve seat 36, three outlets provided in the flat surface are respectively in communication with the outlet ducts 39a, 39b, 39c, a stopper pin 38 provided on the shoulder surface of the valve seat 36 is fixed by riveting, the cushioning rubber 37 is fitted to sleeve the stopper pin 38 and contacts the valve seat 36, a groove is formed on the upper portion of the valve seat so as to prevent the cushioning rubber 37 from disengaging, said cushioning rubber 37 cooperates with a boss on the magnetic rotor component 32 to restrict the rotating range of the magnetic rotor component 32 and to control the starting point; the magnetic rotor component 32, sleeve 33, spring 34, slider 35 are disposed between the valve seat component 30 and the valve casing 31; the three outlets in the valve seat are arranged such that, the circle on which the three outlets are arranged is divided into five equal portions with the center of the circle being taken as benchmark, the three outlets are distributed on three adjacent mean lines, an outlet angle β which is 72° is formed between the second outlet C and either of the first outlet B and the third outlet D.

The detailed structure of the slider is shown in FIGS. 4(a), 4(b), 5(a), 5(b), two communicating passageways 35b1 and 35b2 are provided in the slider, the communicating passageways are holes or cutouts formed in the slider, the two communicating passageways 35b1 and 35b2 are located on the circle which takes the rotating center of the slider as its center, and a communicating passageway angle α which is 144° is formed between the two communicating passageways 35b1 and 35b2.

Figure 6A:
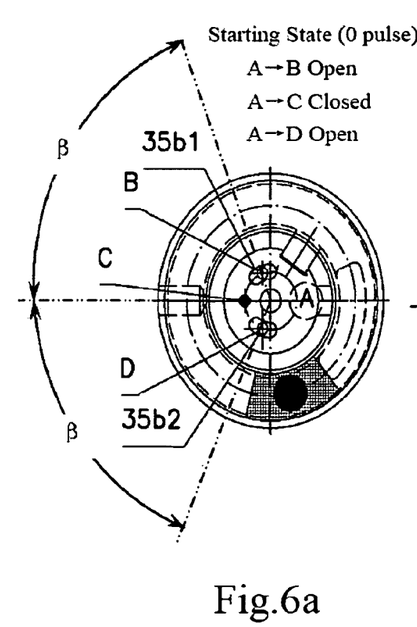
FIGS. 6(a)-6(d) are schematic views of four communicating states between three outlets and a normal open inlet of the motor-operated selector valve of the invention.

Therefore, the following registration relations are formed between the three outlets and the communicating passageways when the slider rotates:

In the first working position (FIG. 6(a)), the first outlet B is registered to the communicating passageway 35b1 of the slider, thereby forming a pathway, and the third outlet D is registered to the communicating passageway 35b2 of the slider, thereby forming a pathway, while the second outlet C is closed; In the second working position (FIG. 6(b), the slider is rotated by 72°), the first outlet B, the third outlet D are closed, and the second outlet C is registered to the communicating passageway 35b1, thereby forming a pathway; In the third working position (FIG. 6(c), the slider is rotated by 144°), the first outlet B, the second outlet C are closed, and the third outlet D is registered to the communicating passageway 35b1, thereby forming a pathway; In the fourth working position (FIG. 6(d), the slider is rotated by 216°), the second outlet C, the third outlet D are closed, and the first outlet B is registered to the communicating passageway 35b2, thereby forming a pathway;

Further, since the normal open inlet A is open into the valve chamber, the following working positions can thus be achieved corresponding to the afore-mentioned registration relations between the three outlets and the communicating passageways: the first working position, in which the first outlet B and the third outlet D are in communication with the normal open inlet A at the same time, and the second outlet C is closed; the second working position, in which the second outlet C is in communication with the normal open inlet A, and the first outlet B, the third outlet D are closed; the third working position, in which the third outlet D is in communication with the normal open inlet A, and the first outlet B, the second outlet C are closed; the fourth working position, in which the first outlet B is in communication with the normal open inlet A, and the second outlet C, the third outlet D are closed.

The magnetic rotor component 32 comprises a magnetic rotor 32a and a shaft 32b, the slider 35 is disposed between the magnetic rotor component 32 and the flat bottom surface 36a of the valve seat, a spring 34 is disposed between the slider 35 and the magnetic rotor component 32 such that a pre-tightening pressure is created between the slider 35 and the flat bottom surface 36a of the valve seat, meanwhile, the slider 35 is provided with keyways which cooperate with the keys on the magnetic rotor component 32 such that the slider 35 and the magnetic rotor component 32 can be rotated synchronously; a tapered sleeve 33 is provided on the shaft 32b of the magnetic rotor component 32, the sleeve 33 is made from materials such as PPS, nylon or PTFE, and is matched with the concave structure centrally formed in the valve casing 31, thus having the function of self-centering and attenuating the operating noise; open/close structures, i.e. outlet orifices or grooves, are provided on the sealing surface 35a of the slider 35 in order to control the opening and closing of the outlets in the working positions.

Figure 6B:
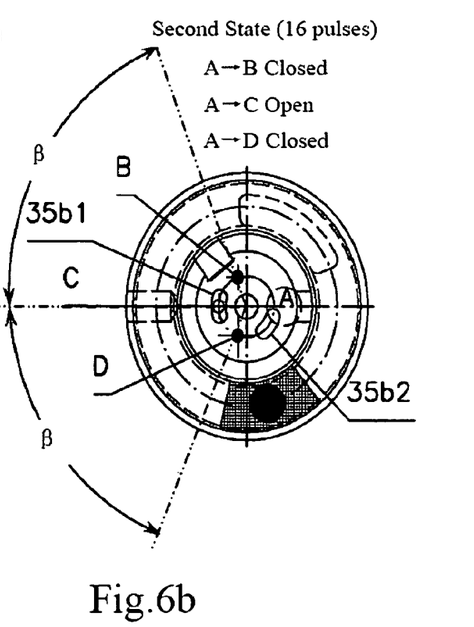
Figure 6C:
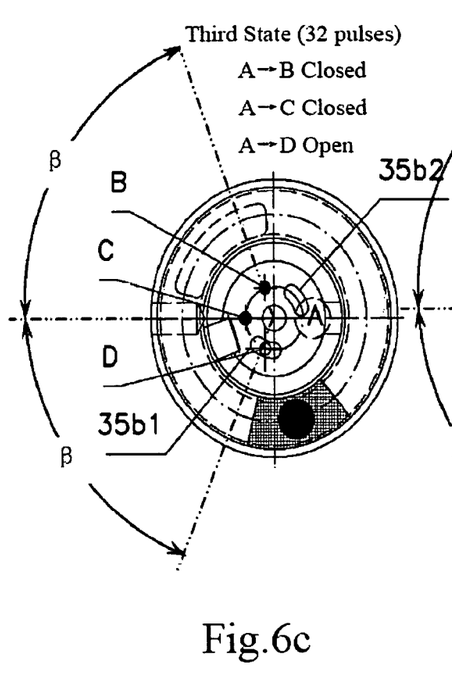
Figure 6D:
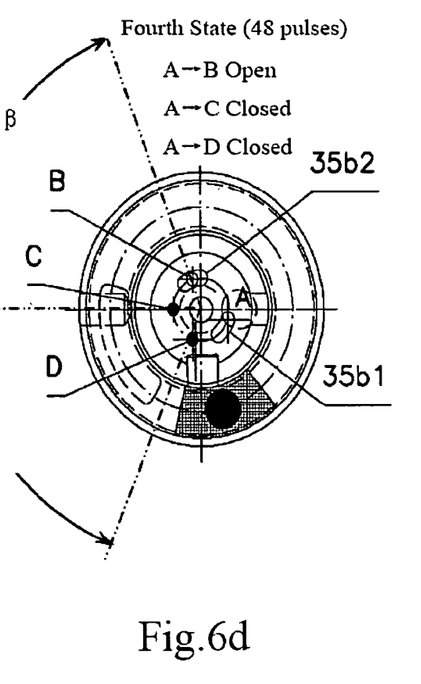
Figure 7:
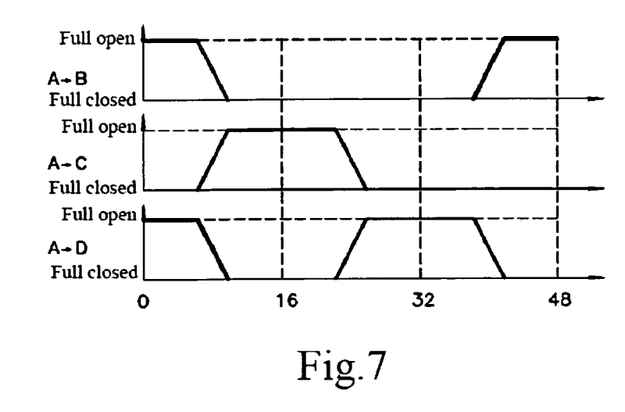
FIG. 7 is a schematic view showing the pulses applied to the stepper motor for switching the working states of the motor-operated selector valve of the invention.

Respectively applying the pulses shown in FIG. 7 to the stepper motor can realize the four working states shown in FIGS. 6(a)-6(b), specifically:

Applying 0 pulse (i.e. the starting state), such that the motor-operated selector valve is in the state shown in FIG. 6(a) where A→B open, A→C close, A→D open;

Applying 16 pulses, such that the motor-operated selector valve is in the state shown in FIG. 6(b) where A→B close, A→C open, A→D close;

Applying 32 pulses, such that the motor-operated selector valve is in the state shown in FIG. 6(c) where A→B close, A→C close, A→D open;

Applying 48 pulses, such that the motor-operated selector valve is in the state shown in FIG. 6(d) where A→B open, A→C close, A→D close.

When revertive pulses opposite to those shown in FIG. 7 are applied to the stepper motor, the communicating relations between the three outlets and the normal open inlet will be another case as follows. Correspondingly, the revertive pulses can be used in the refrigeration cycle device for refrigerators as desired:

Applying 0 pulse, such that the motor-operated selector valve is in the state shown in FIG. 6(d) where A→B open, A→C close, A→D close;

Applying 16 pulses, such that the motor-operated selector valve is in the state shown in FIG. 6(c) where A→B close, A→C close, A→D open;

Applying 32 pulses, such that the motor-operated selector valve is in the state shown in FIG. 6(b) where A→B close, A→C open, A→D close;

Applying 48 pulses (i.e. the starting state), such that the motor-operated selector valve is in the state shown in FIG. 6(a) where A→B open, A→C close, A→D open.

With the afore-mentioned structural arrangement of the invention, the motor-operated selector valve of the invention can be more suitable for functional requirements of the system than a parallel connected assembly constituted by a bistable single-way valve and a bistable two-position three-way solenoid valve in respect of function. The motor-operated selector valve according to the invention is compact in structure and occupies less space. In addition, since the stepper motor can be driven by a voltage of DC12V, the action noise is attenuated and the working stability is enhanced (the disadvantage of vulnerability to interferences resulting from a bistable solenoid valve can be thus eliminated).

Figure 8:
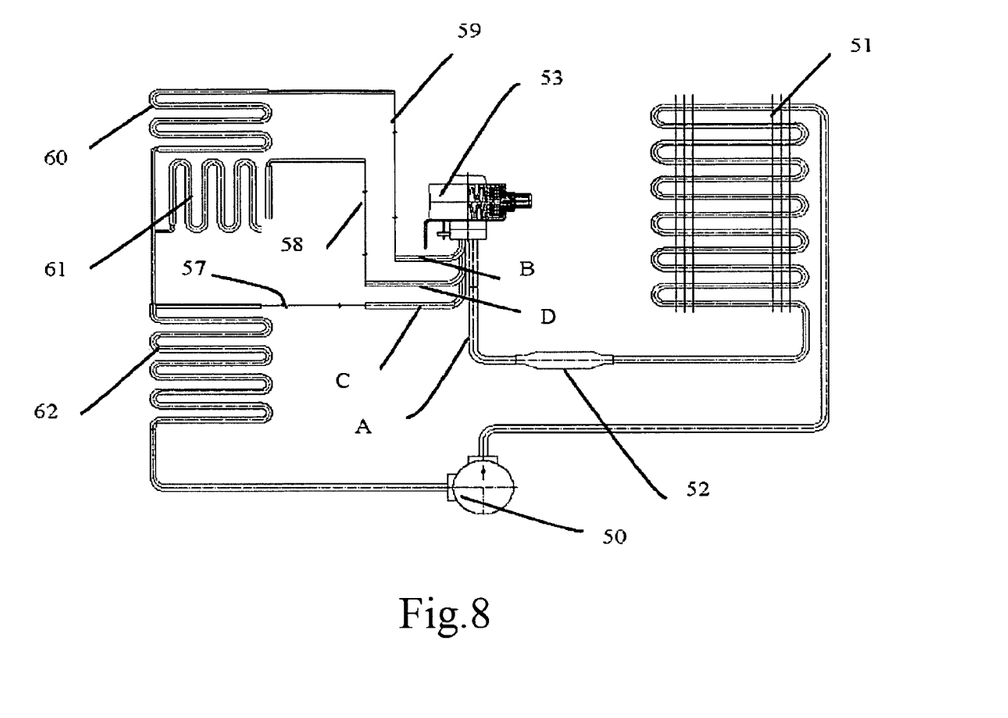
FIG. 8 is a schematic view of a refrigeration cycle system for refrigerators in which the motor-operated selector valve of the invention is used.

An exemplary application of the refrigeration system for refrigerators with a variable temperature section which employs the motor-operated selector valve of the invention is shown in FIG. 8, the exemplary application is as follows:

In FIG. 8, the refrigeration system for refrigerators additionally comprises a variable temperature section evaporator (refrigerators with sections for keeping fresh at 0° C. and for soft freezing at −7° C. may be also provided), the motor-operated selector valve of the invention is applied in the refrigeration system, the specific connections thereof are as follows:

a compressor 50, a condenser 51, a drier-filter 52 are connected in sequence following the flowing direction of the refrigerant, then the drier-filter 52 is connected with a normal open inlet A of an motor-operated selector valve 53, and three outlets B, C, D of the motor-operated selector valve are connected to a refrigerator-applied evaporator 60, a freezer-applied evaporator 62, a variable temperature evaporator 61 via a refrigerator-applied capillary tube 59, a freezer-applied capillary tube 57, a variable temperature capillary tube 58, respectively; said refrigerator-applied evaporator 60 and variable temperature evaporator 61 are connected in parallel, afterwards the circuit thereof are united and then connected in series with the freezer-applied evaporator 62, the freezer-applied evaporator 62 is then connected to the input of the compressor 50 via a duct; the working modes of said motor-operated selector valve are controlled by a stepper motor:

In the first working position which corresponds to FIG. 6(a), the first outlet B and the third outlet D are in communication with the normal open inlet A at the same time, the second outlet C is closed, consequently the following two circuits are operative to refrigerate at the same time: the refrigerator-applied evaporator 60→the freezer-applied evaporator 62; and the variable temperature evaporator 61→the freezer-applied evaporator 62;

In the second working position which corresponds to FIG. 6(b), the second outlet C is in communication with the normal open inlet A, the first outlet B, the third outlet D are closed, consequently the freezer-applied evaporator 62 is operative to refrigerate;

In the third working position which corresponds to FIG. 6(c), the third outlet D is in communication with the normal open inlet A, the first outlet B, the second outlet C are closed, consequently the variable temperature evaporator 61 and the freezer-applied evaporator 62, which are now are connected in series, are operative to refrigerate;

In the fourth working position which corresponds to FIG. 6(d), the first outlet B is in communication with the normal open inlet A, the second outlet C, the third outlet D are closed, consequently the refrigerator-applied evaporator 60 and the freezer-applied evaporator 62, which are now connected in series, are operative to refrigerate.

The afore-mentioned refrigeration system for refrigerators has the following four refrigeration modes in total:

The starting state of the motor-operated selector valve corresponding to FIG. 6(a) (with two cycles operative to refrigerate at the same time):

compressor 50→condenser 51→drier-filter 52→motor-operated selector valve 53→outlet B of the motor-operated selector valve 54→refrigerator-applied capillary tube 59→refrigerator-applied evaporator 60→freezer-applied evaporator 62→compressor (suction);

compressor 50→condenser 51→drier-filter 52→the motor-operated selector valve 53→outlet D of the motor-operated selector valve 55→variable temperature capillary tube 58→variable temperature evaporator 61→freezer-applied evaporator 62→compressor (suction);

The refrigeration in the second working state of the motor-operated selector valve corresponding to FIG. 6(b) is as follows:

compressor 50→condenser 51→drier-filter 52→the motor-operated selector valve 53→outlet C of the motor-operated selector valve 56→freezer-applied capillary tube 57→freezer-applied evaporator 62→compressor (suction);

The refrigerating in the third working state of the motor-operated selector valve corresponding to FIG. 6(c) is as follows:

compressor 50→condenser 51→drier-filter 52→the motor-operated selector valve 53→outlet D of the motor-operated selector valve 55→variable temperature capillary tube 58→variable temperature evaporator 61→freezer-applied evaporator 62→compressor (suction);

The refrigerating in the fourth working state of the motor-operated selector valve corresponding to FIG. 6(d) is as follows:

compressor 50 condenser 51→drier-filter 52→motor-operated selector valve 53→outlet B of the motor-operated selector valve 54→refrigerator-applied capillary tube 59→refrigerator-applied evaporator 60→freezer-applied evaporator 62→compressor (suction);

Compared with the functions imparted from a parallel connected assembly constituted by a bistable two-position three-way solenoid valve and a bistable single-way valve, the functions that the motor-operated selector valve of the invention performs in the refrigeration system make it more suitable for the refrigeration system of refrigerators with variable temperature sections; moreover, the motor-operated selector valve according to the invention has the following advantages: being compact in structure, occupying less space, in addition, since the stepper motor can be driven by a voltage of DC12V, the action noise is attenuated and the working stability is enhanced (the disadvantage of vulnerability to interferences resulting from a bistable solenoid valve can be thus eliminated).

In addition, under the same conception, another connecting structure can be employed in the refrigeration cycle device for refrigerators of the invention, that is, by exchanging the connecting ports of the first outlet B and the third outlet D in the structure shown in FIG. 8 while providing a corresponding control mode, the conception of the invention can also be achieved, the description thereof is omitted herein.

What is claimed is:

1. A motor-operated selector valve, characterized by comprising:
   a valve chamber (25), wherein a valve seat (30) provides with a normal open inlet (A) and a flat bottom surface (36a), a first outlet (B), a second outlet (C) and a third outlet (D) are provided in sequence in the flat bottom surface (36a);
   a magnetic-rotor component (32) which is disposed within the valve chamber (25) and rotatablely displaced under a driving force;
   a slider (35) which is disposed within the valve chamber (25) and moved along with the magnetic rotor component (32), wherein the slider (35) hermetically abuts against said flat bottom surface (36a);
   and a coil component (22) for providing said driving force, wherein the coil component (22) together with the magnetic rotor component (32) constitutes a stepper motor that controls the rotary displacement of said slider (35) among four working positions on the flat bottom surface (36a), and corresponding to each of the four working positions, the three outlets are communicated with the normal open inlet (A) respectively via flow-guiding orifices provided in said slider (35), said flow-guiding orifices are two spaced communicating passageways (35b1, 35b2) provided in the slider, one of said two communicating passageways (35b1, 35b2) communicates the normal open inlet (A) with one of said three outlets (B, C, D), said two communicating passageways (35b1, 35b2) are configured to achieve said four working positions including:
   a first working position, in which the first outlet (B) and the third outlet (D) are in communication with said two communicating passageways (35b1, 35b2), respectively, and the first outlet (B) and the third outlet (D) are in communication with the normal open inlet (A) at the same time, the second outlet (C) is closed;
   a second working position, in which the second outlet (C) is in communication with one (35b1) of the communicating passageways, and the second outlet (C) is in communication with the normal open inlet (A), and the first outlet (B) and the third outlet (D) are both closed;
   a third working position, in which the third outlet (D) is in communication with one (35b1) of the communicating passageways, and the third outlet (D) is in communication with the normal open inlet (A), and the first outlet (B) and the second outlet (C) are both closed;
   a fourth working position, in which the first outlet (B) is in communication with the other communicating passageway (35b2), and the first outlet (B) is in communication with the normal open inlet (A), and the second outlet (C) and the third outlet (D) are both closed.

2. The motor-operated selector valve according to claim 1, characterized in that said four working positions are arranged in a successive manner.

3. The motor-operated selector valve according to claim 2, characterized in that the initial position of said stepper motor corresponds to the first working position, and the final position of said stepper motor corresponds to the fourth working position.

4. The motor-operated selector valve according to claim 2, characterized in that the initial position of said stepper motor corresponds to the fourth working position, and the final position of said stepper motor corresponds to the first working position.

5. The motor-operated selector valve according to claim 1, characterized in that said communicating passageways (35b1, 35b2) are two holes or gaps formed in the slider.

6. The motor-operated selector valve according to claim 1, characterized in that said two communicating passageways (35b1, 35b2) are located on a circle which takes the rotating center of the slider as its center, and a communicating passageway angle (α) is formed between the two communicating passageways (35b1, 35b2), said three outlets (B, C, D) are located on a circle which takes the rotating center of the slider as its center, and an outlet angle (β) is formed between the two adjacent outlets, wherein said communicating passageway angle (α) is approximately two times bigger than said outlet angle (β).

7. The motor-operated selector valve according to any one of claim 1-4, characterized in that said magnetic rotor component (32) is supported within said valve chamber (25) by a supporting shaft (32b) to which said slider (35) is connected.

8. The motor-operated selector valve according to claim 7, characterized in that said slider (35) and said supporting shaft (32b) are connected, and a compression spring (34) is supported between the slider and the magnetic rotor component.

9. The motor-operated selector valve according to claim 8, characterized in that said valve chamber (25) is surrounded by members including an valve casing (31), the magnetic-rotor component (32) is provided with a sleeve (33) having a tapered surface, at a portion of the component (32) contacting said valve casing (31); one end of said supporting shaft (32b) is disposed within the sleeve (33), the valve casing (31) is provided with a concave formation at a portion contacting the sleeve (33).

10. The motor-operated selector valve according to any one of claim 1-4, characterized in that a stopper is provided between said valve seat (36) and said magnetic rotor component (32), a cushion (37) is mounted on the stopper.

11. The motor-operated selector valve according to any one of claim 1-4, characterized in that said slider (35) is made from PPS, PA or PTFE.

12. A refrigeration cycle device for refrigerators, characterized by comprising a compressor (50), a condenser (51), a drier-filter (52) and they are connected in sequence following the flowing direction of a refrigerant; wherein the drier-filter (52) is then connected with the normal open inlet (A) of the motor-operated selector valve (53) as claimed in claim 1, then first, second, and third outlets (B, C, D) of the motor-operated selector valve are connected to a refrigerator-applied evaporator (60), a freezer-applied evaporator (62), a variable temperature evaporator (61) respectively via a refrigerator-applied capillary tube (59), a freezer-applied capillary tube (57), a variable temperature capillary tube (58); wherein said refrigerator-applied evaporator (60) and said variable temperature evaporator (61) are connected in parallel, afterwards the circuits thereof are united and then connected in series with the freezer-applied evaporator (62), the freezer-applied evaporator (62) is then connected to an input of the compressor (50) via a duct; working modes of said motor-operated selector valve are controlled by a stepper motor:
 in a first working position, the first outlet (B) and the third outlet (D) are in communication with the normal open inlet (A) at the same time, and the second outlet (C) is closed, consequently the following two circuits are operative to refrigerate simultaneously: the refrigerator-applied evaporator (60) and the freezer-applied evaporator (62); and the variable temperature evaporator (61) and the freezer-applied evaporator (62);
 in a second working position, the second outlet (C) is in communication with the normal open inlet (A), and the first outlet (B) and the third outlet (D) are both closed, consequently the freezer-applied evaporator (62) is operative to refrigerate;
 in a third working position, the third outlet (D) is in communication with the normal open inlet (A), and the first outlet (B) and the second outlet (C) are both closed, consequently the variable temperature evaporator (61) and the freezer-applied evaporator (62), which are now connected in series, are operative to refrigerate;
 in a fourth working position, the first outlet (B) is in communication with the normal open inlet (A), and the second outlet (C) and the third outlet (D) are both closed, consequently the refrigerator-applied evaporator (60) and the freezer-applied evaporator (62), which are now connected in series, are operative to refrigerate.

13. The refrigeration cycle device for refrigerators according to claim 12, characterized in that the initial position of said stepper motor corresponds to the first working position, and the final position of said stepper motor corresponds to the fourth working position.

14. The refrigeration cycle device for refrigerators according to claim 12, characterized in that the initial position of said stepper motor corresponds to the fourth working position, and the final position of said stepper motor corresponds to the first working position.

15. A refrigeration cycle device for refrigerators, characterized by comprising a compressor (50), a condenser (51), a drier-filter (52), and they are connected in sequence following the flowing direction of a refrigerant; wherein the drier-filter (52) is then connected with the normal open inlet (A) of the motor-operated selector valve (53) as claimed in claim 1, then first, second, and third outlets (B, C, D) of the motor-operated selector valve are connected to a variable temperature evaporator (61), a freezer-applied evaporator (62), a refrigerator-applied evaporator (60) respectively via a variable temperature capillary tube (58), a freezer-applied capillary tube (57), a refrigerator-applied capillary tube (59); wherein said variable temperature evaporator (61) and said refrigerator-applied evaporator (60) are connected in parallel, afterwards the circuits thereof are united and then connected in series with the freezer-applied evaporator (62), the freezer-applied evaporator (62) is then connected to an input of the compressor (50) via a duct; working modes of said motor-operated selector valve are controlled by a stepper motor:
 in a first working position, the first outlet (B) and the third outlet (D) are in communication with the normal open inlet (A) at the same time, and the second outlet (C) is closed, consequently the following two circuits are operative to refrigerate simultaneously: the variable temperature evaporator (61) and the freezer-applied evaporator (62); and the refrigerator-applied evaporator (60) and the freezer-applied evaporator (62);
 in a second working position, the second outlet (C) is in communication with the normal open inlet (A), and the first outlet (B) and the third outlet (D) are both closed, consequently the freezer-applied evaporator (62) is operative to refrigerate;
 in a third working position, the third outlet (D) is in communication with the normal open inlet (A), and the first outlet (B) and the second outlet (C) are both closed, consequently the refrigerator-applied evaporator (60) and the freezer-applied evaporator (62), which are now connected in series, are operative to refrigerate;
 in a fourth working position, the first outlet (B) is in communication with the normal open inlet (A), and the second outlet (C) and the third outlet (D) are both closed, consequently the variable temperature evaporator (61) and the freezer-applied evaporator (62), which are now connected in series, are operative to refrigerate.

16. The refrigeration cycle device for refrigerators according to claim 15, characterized in that the initial position of said stepper motor corresponds to the first working position, and the final position of said stepper motor corresponds to the fourth working position.

17. The refrigeration cycle device for refrigerators according to claim 15, characterized in that the initial position of said stepper motor corresponds to the fourth working position, and the final position of said stepper motor corresponds to the first working position.

* * * * *